United States Patent
Jin et al.

(10) Patent No.: US 7,492,345 B2
(45) Date of Patent: Feb. 17, 2009

(54) LIQUID CRYSTAL DISPLAY FOR PERFORMING TIME DIVISIONAL COLOR DISPLAY, METHOD OF DRIVING THE SAME BACKLIGHT UNIT FOR LIQUID CRYSTAL DISPLAY

(75) Inventors: Bo Jin, Shanghai (CN); Cheol-Woo Park, Suwon (KR); Woong-Kyu Min, Namyangju (KR)

(73) Assignee: Samsung Electronics Co., Ltd. (KR)

( * ) Notice: Subject to any disclaimer, the term of this patent is extended or adjusted under 35 U.S.C. 154(b) by 455 days.

(21) Appl. No.: 10/515,491

(22) PCT Filed: Jul. 22, 2002

(86) PCT No.: PCT/KR02/01371

§ 371 (c)(1),
(2), (4) Date: Nov. 24, 2004

(87) PCT Pub. No.: WO03/107083

PCT Pub. Date: Dec. 24, 2003

(65) Prior Publication Data

US 2006/0050047 A1    Mar. 9, 2006

(30) Foreign Application Priority Data

Jun. 18, 2002 (KR) .............................. 2002-34000

(51) Int. Cl.
*G09G 3/36* (2006.01)
(52) U.S. Cl. ........................................ 345/102; 345/87
(58) Field of Classification Search ............ 345/87, 345/88, 102
See application file for complete search history.

(56) References Cited

U.S. PATENT DOCUMENTS

| 5,247,375 | A  | * | 9/1993  | Mochizuki et al. ............. 349/84 |
| 6,570,554 | B1 | * | 5/2003  | Makino et al. ............... 345/102 |
| 6,828,954 | B2 | * | 12/2004 | Yoshihara et al. ........... 345/102 |
| 2001/0038371 | A1 | * | 11/2001 | Yoshinaga et al. ............ 345/87 |

FOREIGN PATENT DOCUMENTS

| CN | 1337668  | 2/2002 |
| JP | 01158417 | 6/1989 |
| JP | 02111922 | 4/1990 |

(Continued)

*Primary Examiner*—Amare Mengistu
*Assistant Examiner*—Yuk Chow
(74) *Attorney, Agent, or Firm*—Cantor Colburn LLP

(57) ABSTRACT

The present invention relates to a liquid crystal display of a time divisional color display, which includes a plurality of pixels having liquid crystal capacitors, respectively, and light is not supplied to some pixels and light supplied to other pixels. Preferably, data voltages are applied to the pixels to which light is not supplied and data voltages are not applied to the pixel to which light is supplied. Accordingly, since a liquid crystal panel assembly is divided into several areas to be scanned sequentially and a light source of a light source unit corresponding to the area being scanned is maintained in light-off state, it is possible to secure enough data scan time as well as to increase light-on-time of the light sources. With this, time to charge electric charges of the liquid crystal capacitors is increased to improve image quality, and, according as light-on time of the light sources is increased, clearness of the image quality is also increased.

21 Claims, 7 Drawing Sheets

FOREIGN PATENT DOCUMENTS

| | | |
|---|---|---|
| JP | 05-080716 | 4/1993 |
| JP | 08286629 | 11/1996 |
| JP | 09197979 | 7/1997 |
| JP | 11119189 | 4/1999 |
| JP | 11-202286 | 7/1999 |
| JP | 11237606 | 8/1999 |
| JP | 11258573 | 9/1999 |
| JP | 11281966 | 10/1999 |
| JP | 2000180825 | 6/2000 |
| JP | 2000321993 | 11/2000 |
| JP | 2001092370 | 4/2001 |
| JP | 2001-133746 | 5/2001 |
| JP | 2001210122 | 8/2001 |
| JP | 2001-265287 | 9/2001 |
| JP | 2001290124 | 10/2001 |
| JP | 2002031798 | 1/2002 |
| JP | 2002107750 | 4/2002 |
| KR | 10-1997-0066687 | 10/1997 |
| KR | 010047093 A | 6/2001 |
| KR | 20010050411 A | 6/2001 |
| KR | 1020010090761 A | 10/2001 |
| KR | 1020010113017 A | 12/2001 |
| KR | 1020010092374 A | 10/2004 |
| WO | 9110223 | 7/1991 |

\* cited by examiner

LIQUID CRYSTAL DISPLAY FOR PERFORMING TIME DIVISIONAL COLOR DISPLAY, METHOD OF DRIVING THE SAME BACKLIGHT UNIT FOR LIQUID CRYSTAL DISPLAY

BACKGROUND OF THE INVENTION (a) Field of the Invention

The present invention relates to a liquid crystal display for performing time divisional color display, a driving method thereof, and a backlight unit for the liquid crystal display (b) Description of the Related Art Generally, a liquid crystal display ("LCD"), which includes two panels and a liquid crystal layer having dielectric anisotropy and interposed between the panels, controls the transmittance of light passing through the, liquid crystal layer by applying electric field to the liquid crystal layer and adjusting the field strength for displaying desired images. This LCD is a representative of flat panel display easy to carry, and, in particular, a TFT-LCD is mainly used, which employs thin film transistors ("TFTs") as switching elements.

To implement color display in the TFT-LCD, each pixel represents any one of red R, green G and blue B (space divisional color display) or all of the pixels represent R, G and B colors depending on time (time divisional color display).

The space divisional color display represents colors by providing color filters of R, G and B in areas corresponding to pixel electrodes. In this case, it is possible to represent colors by transmitting lights from white light source such as a light emitting diode (LED), a cold cathode fluorescent lamp (CCFL), etc., into a liquid crystal layer and the color filters.

The time divisional color display displays color of the LCD by providing a light source of R, G and B (LED or a fluorescent lamp) separately.

A conventional time divisional color display scans all of the pixels according to operations of a gate driver and a data driver, and turns on red light sources. It scans all of the pixels again and turns on green light sources, and finally, scans all of the pixels again and turns on blue light sources. Therefore, it performs three frames, once for each of R, G and B, during one frame time (normally, 16.6 ms) in the space divisional color display. Accordingly, each duration of frames is decreased to 5.5 ms.

SUMMARY OF THE INVENTION

Therefore, since data are scanned and the light sources are lighted on during short time of 5.5 ms, the scan operation and light-on operation must be performed more than three times faster than using color filters. With this, there is a problem that time to charge electric charges of liquid crystal capacitors is decreased, and, in particular, this problem become serious as the size of the LCD becomes larger. In addition, light-on time of the light sources becomes shorter, and thereby, there is a problem of not displaying desired colors.

An object of the present invention is to solve the conventional problems, and to improve image quality in the LCD of the time divisional color display by increasing time to charge electric charges of the liquid crystal capacitors.

Another object of the present invention is to increase light-on time of the light sources in the LCD of the time divisional color display.

The LCD of the time divisional color display to accomplish the objects includes:

a liquid crystal panel assembly including a plurality of scan areas, each of which has a plurality of pixels, each having a liquid crystal capacitor filled with a liquid crystal material; and a plurality of light source units supplying light to corresponding the scan areas, provided in correspondence with the scan areas, wherein the scan areas are sequentially scanned to be provided with data voltages, and each of the light source units comprise a plurality of light sources of single colors, and the data voltages comprise a plurality of color data voltages corresponding to each of colors of the light sources, wherein the color data voltages are alternately supplied with the respective scan areas, and the light sources the light source units are lighted off during scan of the scan areas, and, after each of the light sources of the light source units supplies corresponding color data voltage to the corresponding scan area, it is lighted on at least one time during scan of the other scan areas.

The light sources of the single colors preferably include red, green and blue light sources.

According to an embodiment of the present invention, each of the pixels further includes a switching element for switching the data voltage supplied to the liquid crystal capacitor. The switching element includes a control terminal, an input terminal and an output terminal, and the output terminal is connected to the liquid crystal capacitor.

The LCD according to an embodiment of the present invention further includes a plurality of first signal lines connected to the control terminals to supply control voltages for turning on the switching elements and a plurality of second signal lines connected to input terminals to supply the data voltages.

An embodiment of the present invention, the pixels are arranged in a matrix form, and the first signal lines are extended in a row direction and the second signal lines are extended in a column direction. The control voltages are supplied in a column direction sequentially, and the data voltages are simultaneously supplied through second signal lines connected to pixels supplied with the control voltages.

The scan lines are preferably arranged in a column direction, and the light source units may be disposed in side of the liquid crystal panel assembly.

The LCD may further include blocking members disposed among the scan areas to block leakage of light.

The LCD may further include a data driver selecting gray voltages corresponding to gray signals supply them to the pixels as data voltages; a signal controller supplying the gray signals and an input control signal for controlling the gray signals to the data driver; and a light controller controlling operation of light-on/off of the light sources according to a control signal from the signal controller.

The signal controller may control the light source units in order to supply light to corresponding scan areas right after completion of scan, and may control the light source unit in order to supply light to corresponding scan areas after a lapse of a specific period after completion of scan.

The light sources may be luminescent lamps, and, in this case, the signal controller preferably controls the light sources in order to be lighted off before a specific period of start of scan.

A method of driving an LCD of a time divisional color display comprising a plurality of first pixels and a plurality of second pixels, each of which has a liquid crystal capacitor filled with liquid crystal material, the method includes:

a first light blocking step of blocking light supplied to the first pixels;

a first data voltages applying step of applying first data voltages to the first light-blocked pixels;

a first light supplying step of supplying light of a first color out of red, green and blue to the first pixels where applying of the first data voltages are completed;

a second light blocking step of blocking light supplied to the second pixels;

a second data voltages supplying step of applying second data voltages to the second light-blocked pixels; and a second light supplying step of supplying light of the first color to the pixels where applying of the second data voltages is completed.

The method of driving the LCD according to an embodiment of the present invention further includes:

a third light blocking step of blocking light supplied to the pixels;

a third data voltage applying step of applying third data voltages to the third light-blocked pixels;

a fourth light supplying step of supplying a second color different from a first color out of red, green and blue to the pixels where applying of the third data voltages is completed;

a fourth light blocking step of blocking light supplied to the second pixels;

a fourth data voltages applying step of applying fourth data voltages to second the light-blocked pixels; and a fourth light supplying step of supplying light of the second color to the pixels where applying of the fourth data voltages is completed.

The first or the second light supplying step preferably supplies light after a lapse of a specific time after applying of the data voltages is completed.

The first or the second light blocking step may start faster than the first or the second data voltages applying step.

The first data voltages applying step and the second data voltages applying step are preferably performed in succession, the first light supplying step may start later than the second light blocking step.

A backlight unit for an LCD to accomplish the objects of the present invention includes:

a light-guide plate located at lower side of a liquid crystal panel assembly and divided into several parts;

a plurality of red, green and blue light sources provided at sides of the respective parts of the light-guide plate; and blocking members provided at borders of several parts of the light-guide plate and preventing light, which is supplied from the light sources to the respective parts of the light-guide plate, from passing over the other parts.

In this case, the blocking members are preferably coated with aluminum.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF PREFERRED EMBODIMENTS

The present invention now will be described more fully hereinafter with reference to the accompanying drawings, in which preferred embodiments of the inventions invention are shown. This invention may, however, be embodied in many different forms and should not be construed as limited to the embodiments set forth herein. Like numerals refer to like elements throughout.

An LCD according to an embodiment of the present invention will be described.

Figure 1:
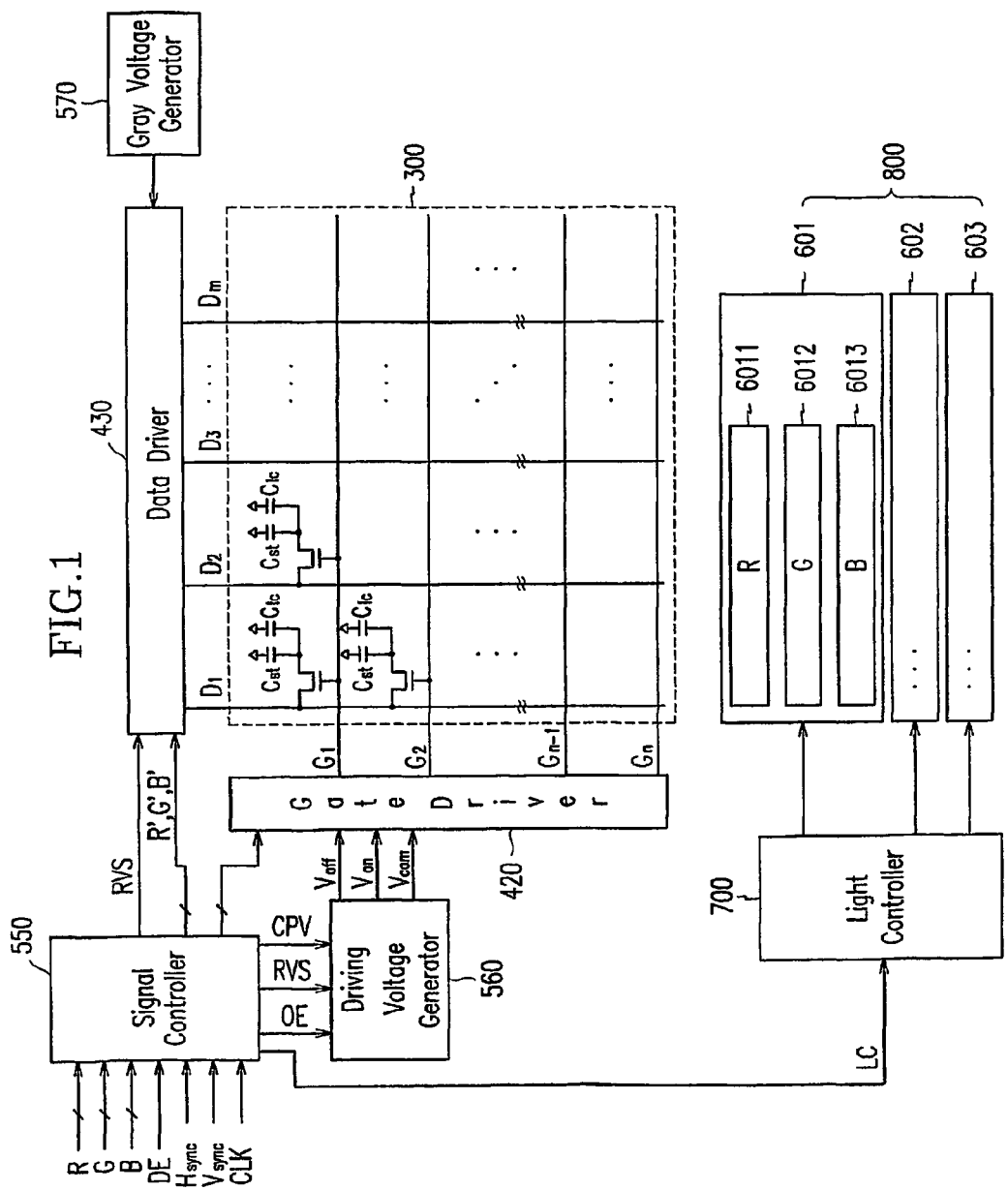
FIG. 1 is a block diagram of a LCD according to an embodiment of the present invention.
Figure 2:
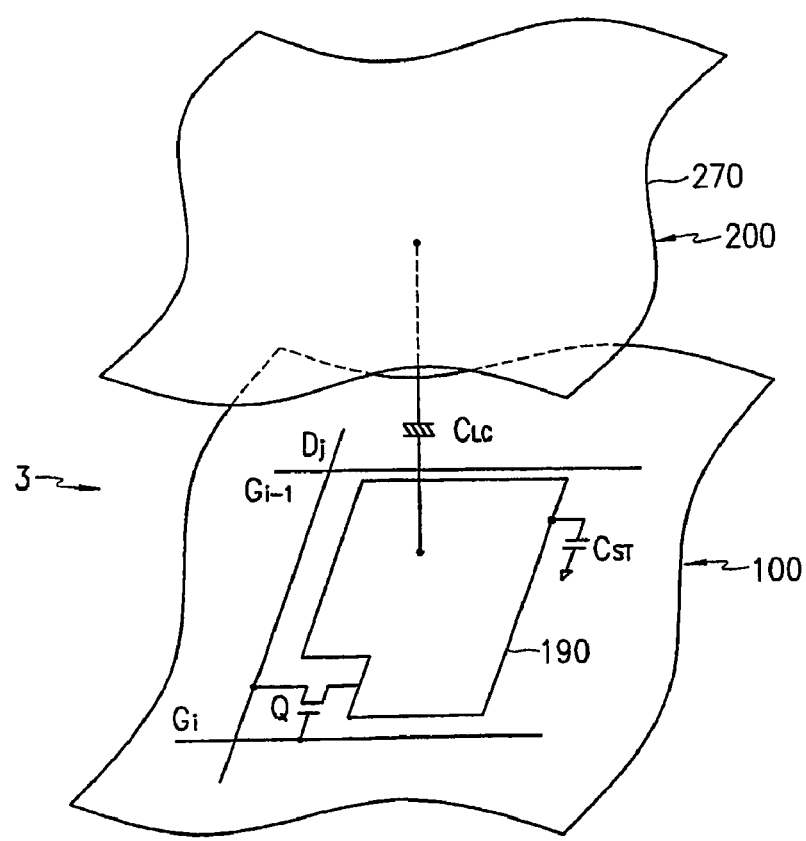
FIG. 2 is an equivalent circuit of a single pixel.
Figure 3:
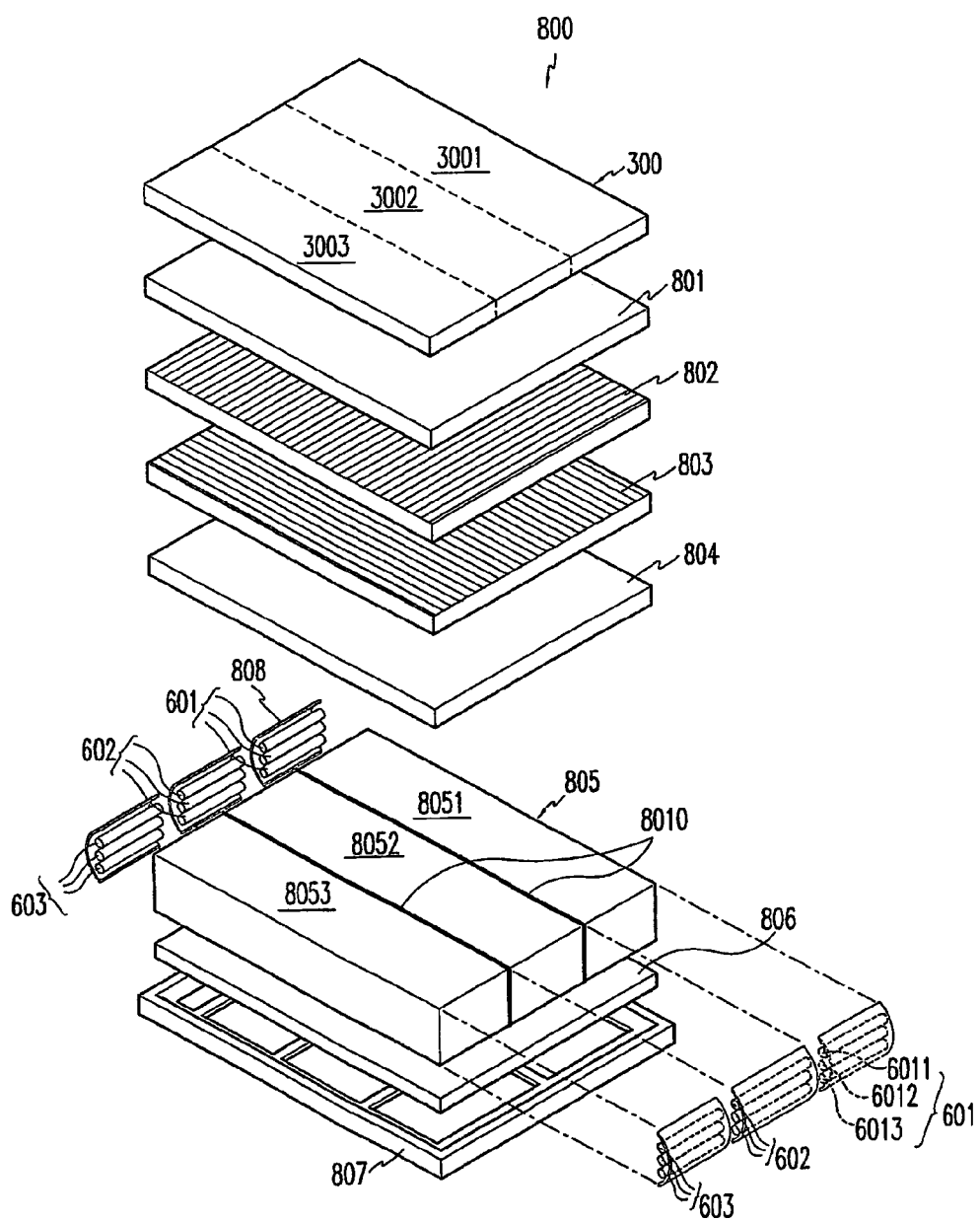
FIG. 3 is a perspective view of a backlight unit according to an embodiment of the present invention.

FIG. 1 is a block diagram of an LCD according to an embodiment of the present invention, and FIG. 2 is an equivalent circuit diagram of a single pixel. FIG. 3 is a perspective view of a backlight unit according to an embodiment of the present invention.

As shown in FIG. 3, the LCD according to the present invention includes a liquid crystal panel assembly 300 and a gate driver 420 and a data driver 430 connected thereto, a driving voltage generator 560 connected to the gate driver 420, a gray voltage generator 570 connected to the data driver 430, a backlight unit 800 supplying lights to the liquid crystal panel assembly 300, a light controller 700 connected to the backlight unit 800, and signal controller 550 controlling them.

The liquid crystal panel assembly 300 includes a plurality of signal lines G1-Gn and $D_1$-Dm in terms of an equivalent circuit, and a plurality of pixels connected thereto, and the respective pixels include switching elements Q connected to the signal lines $G_1$-Gn and $D_1$-Dm and liquid crystal capacitors $C_{IC}$ and storage capacitors $C_{st}$ connected to the switching elements Q. The signal lines $G_1$-Gn and $D_1$-Dm includes a plurality of scan lines or gate lines $G_1$-Gm transmitting scan signals or gate signals and extending in a row direction, and a plurality of data signal lines or data lines $D_1$-$D_n$ transmitting image signals or data signals and extending in a column direction. The switching elements Q are three-terminal elements, and control terminals thereof are connected to the gate lines $G_1$-Gm, input terminals thereof are connected to the data lines $D_1$-$D_n$, output terminals thereof are connected to one terminal of the liquid crystal capacitors $C_{IC}$ and the storage capacitors $C_{st}$.

The liquid crystal capacitors $C_{IC}$ are connected the output terminals of the switching elements Q and a common voltage $V_{com}$ or a reference voltage. The other terminals of the storage capacitors $C_{st}$ are connected to another voltage such as the reference voltage. However, the other terminals of the storage capacitors $C_{st}$ may be connected to right above gate lines (hereinafter, referred to as "previous gate lines"). The former is referred to as a separate wire type and the latter is referred to as a previous gate type.

Meanwhile, the liquid crystal panel assembly 300 may be represented schematically in terms of structure as shown in FIG. 2. For conveniences, FIG. 2 shows a single pixel.

As shown in FIG. 2, the assembly 300 includes a lower display panel 100 and an upper display panel 200 facing with each other and a liquid crystal layer 3 interposed therebetween. One the lower display panel 100, the gate lines $G_{i-1}$ and $G_i$ and the data line $D_j$, the switching element Q and the storage capacitor $C_{st}$ are provided. The liquid crystal capacitor C has two terminals, pixel electrode 190 of the lower panel 100 and the reference electrode 270 of the upper panel 200, and the liquid crystal layer 3 interposed therebetween works as a dielectric.

The pixel electrode 190 is connected to the switching element Q and the reference electrode 270 is formed on the entire upper panel 200 and is connected to the common voltage $V_{com}$.

Herein, the orientations of the liquid crystal molecules are changed by variation of electric fields generated by the pixel electrode 190 and the reference electrode 270, and according thereto, the polarization of light passing through the liquid crystal layer 3 is also changed. This change of the polarization causes the change of transmittance of light by polarizers (not shown) attached to the panels 100 and 200.

The pixel electrode 190 forms the storage capacitor $C_{st}$ by overlapping the previous gate line $G_{i-1}$. In the previous gate type, the pixel electrode 190 overlaps the previous gate line $G_{i-1}$ through the medium of an insulator to form the two terminals of the storage capacitor $C_{st}$ together with the previous gate line $G_{i-1}$.

FIG. 2 shows a MOS transistor as an example of the switching transistor Q, and this MOS transistor is implemented by a thin film transistor of forming amorphous silicon or polysilicon as a channel layer.

The reference electrode 270 may be provided in the lower panel 100 alternately to FIG. 2, and, in this case, the two electrodes 190 and 270 all are formed as linear shapes.

The backlight unit 800 includes three light source units 601-603. The light source units 601-603 are provided in side or back of the liquid crystal panel assembly 300, and each of them has a red light source 6011, a green light source 6012 and a blue light source 6013.

Although the number of the light source units 601, 601 and 603 is three in the embodiment of the present invention, it is possible to be two or more than four.

FIG. 3 shows a structure of the backlight unit 800 according to an embodiment of the present invention.

The backlight unit 800 according to the embodiment of the present invention includes a protection sheet 801, a pair of light collecting sheet 802 and 803, a diffusion sheet 804, a light-guide plate 805, a reflection plate 806, a plurality of light source units 601, 602 and 603 located in both sides of the light-guide plate 805, and a plurality of light source reflection plates 808.

The light-guide plate 805 is made of plastic based transparent material and guides light from the light sources 6011, 6012 and 6013 to the liquid crystal panel assembly 300. The light-guide plate 805 is a plate having a rectangular almost the same as the liquid crystal panel assembly 300, and is divided into three rectangular portions 8051, 8052 and 8053 arranged in a longitudinal direction as shown in FIG. 3. The three portions 8051-8053 are substantially equal sizes, and the border surfaces thereof are extending in a elongated direction of the gate lines $G_1$-$G_n$. Separating walls 8010 extending along the border surfaces therebetween are provided. The separating walls 8010 are coated with aluminum for reflecting well.

The light source units 601-603, each of which includes the light sources 6011-6013 of a plurality of mono color, for example, three colors of red, green and blue, are provided on both sides of each portion 8051-8053. The opposite sides of the light-guide plate 805 of the light source units 601-603 are covered with the light source reflecting plates 808 of semi-cylindered shapes, which direct light from the light sources 601-603 to the light-guide plate 805 without leakage of light.

The reflecting plate 806 works as reflecting light, which strays away the light-guide plate 805 to direct downward, to the light-guide plate 805 again.

The diffusion sheet 804 is disposed between the light-guide plate 805 and the liquid crystal panel 300 to diffuse light passing through the light-guide plate 805, thereby preventing partial collection of light.

On upper side of each of light collecting sheets 802 and 803 located on the diffusion sheet 804, a plurality of prisms of triangular cylinders are provided. The prisms extend in parallel in one direction with each other, and elongated directions of the two prisms on the two light collecting 802 and 803 are orthogonal each other. The light collecting sheets 802 and 803 make light from the diffusion sheet 804 to be collected in the display panel of the liquid crystal panel assembly 300.

The protection sheet 801 is disposed on the light collecting sheet 802 to protect it and diffuses light to uniforms distribution of light.

As described above, the light-guide plate 805 is divided into three portions and the light sources 601-603 are disposed at the sides of the each of portions 8051-8053, and then, the separate walls 8010 are disposed in the borders of the respective portions. Then, light generated from the light source units 601-603 of the respective portions 8051-8053 becomes incident to only corresponding portions 8051-8053 but does not become incident to the other portions 8051-8053. Therefore, light from the light source units 601-603 becomes incident to only corresponding regions 3001-3003 of the liquid crystal panel assembly 300 corresponding to the respective portions 8051-8053 of the light-guide plate 805 but does not become incident to the other portions. In particular, such is because the thicknesses of the diffusion sheet 804, the light collecting sheets 802 and 803 and the protection sheets 801.

Referring to FIG. 1 again the gate driver 420 and the data driver 430 are called a scan driver and a source driver, respectively, and are generally composed of a plurality of gate driving IC and a plurality of data driving IC. Each of the ICs may be exist at external side separately or be mounted on the assembly 300, and may be formed on the assembly 300 with the same process as the signal lines $G_1$-$G_m$ and $D_1$-$D_n$ and the thin film transistor Q.

The gate driver 420 is connected to the gate lines $G_1$-$G_m$ of the liquid crystal panel assembly 300 to apply gate signals composed of the gate on voltage Von and the gate off voltage $V_{off}$ to the gate lines G1-Gm.

The data driver 430 is connected to the data lines D1-Dn of the liquid crystal panel assembly and selects gray voltages from the gray voltage generator 570 to apply them to the data lines $D_1$-$D_n$ as data signals.

The gate driver 420, the data driver 430, the driving voltage generator 560 and the light controller 700 are located at external side of the liquid crystal panel assembly 300, and the operations thereof are controlled by the signal controller 550. This will be described in detail in the following.

The signal controller 550 is provided with RGB gray signals R, G and B and input control signals for controlling display thereof, such as, a vertical synchronizing signal $V_{sync}$, a horizontal synchronizing signal $H_{sync}$, a main clock CLK and a data enable signal DE, from an external graphic controller (not shown). The signal controller 550 generates a gate control signal and a data control signal on the basis of the input control signals and suitably processes the gray signals R, G and B in accordance with the operation condition of the liquid crystal panel assembly 300. Then, the signal controller 550 sends the gate control signal to the gate driver 420 and the driving voltage generator, and it sends the data control signal and the processed gray signals R', G' and B' to the data driver 430. En addition, the signal controller 550 sends a light control signal LC to the light controller 700 on the basis of the input control signal, the gate control signal or the data control signal.

The gate control signal includes a vertical synchronization start signal STV for instructing output start of a gate on pulse (high interval of the gate signal), a gate clock signal CPV for controlling output time of the gate on pulse and a gate on enable signal OE for the width of the gate on pulse. Out of them, the gate on enable signal OE and the gate clock signal CPV are supplied from the driving voltage generator 560. The data control signal includes a horizontal synchronization start signal STH for instructing input start of the gray signals, a load signal LOAD or TP for applying corresponding voltages to the data lines and a data clock signal HCLK. In addition, the light control signal LC is a signal that lights on/off the light sources 6011-6013 for respective red, green and blue of the light units 601-603 at corresponding time.

The gate driver 420 applies the gate on pulse to the gate lines $G_1$-$G_m$ according to the gate control signal from the signal controller 550 to turn on switching elements Q in one row connected to the gate lines $G_1$-$G_m$. At the same time, the data driver 430 applies analog signals, which are generated from the gray voltage generator and correspond to the gray signals R', G' and B', to the corresponding data lines $D_1$-$D_n$ of the pixel row where the switching elements Q are located, as data signals, according to the data control signal from the signal controller 550. The data signals supplied to the data lines D1-Dn are applied to the corresponding pixels through the turned-on switching elements Q. The data scan for one frame with such operation is performed, for example, during 5.5 ms.

While such data scan operation is performed, the light controller 700 lights on/off the light sources 6011-4013 of the respective 601-603 according to the light signal LC from the signal controller 550. The light-on/off of the light sources 6011-6013 are controlled on the basis of scan operation of the respective virtual areas 3001-3003 of the liquid crystal display panel 300. That is, all of the light sources of the light units 601-603 corresponding to areas 3001-3003, in which the scan operation continues, are lighted off and the other of the light sources of the light source units 601-603 are lighted on.

Such operation of the light sources control will be described in detail with reference to FIG. 4.

Figure 4:
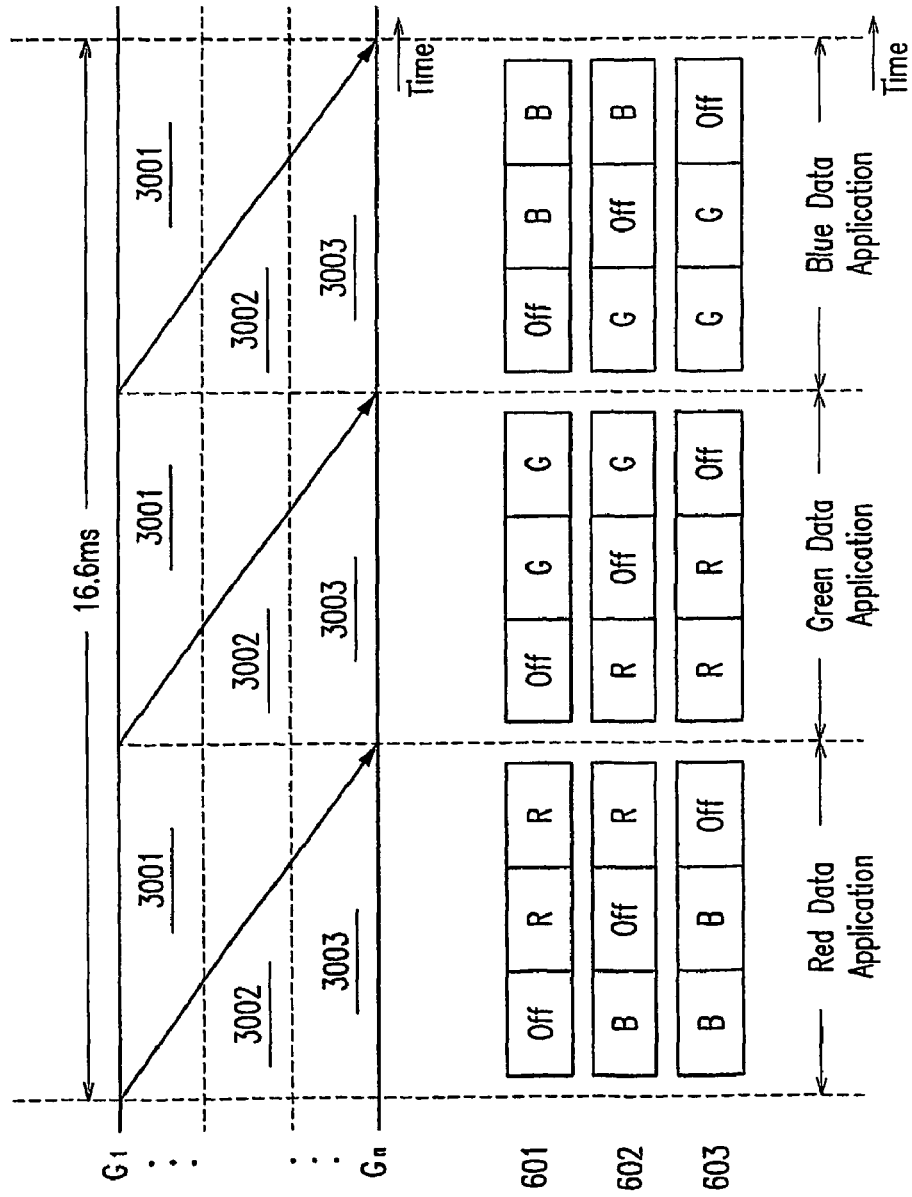
FIG. 4 is a schematic view to illustrate a lighting principle of a light source according to an embodiment of the present invention.

FIG. 4 is a schematic view to illustrate principle of light on/off according to an embodiment of the present invention. For convenience of explanation, the virtual areas 3001-3003 are referred to as a first area 3001, a second area 3002 and a third area 3003, sequentially from the above, and the light source units corresponding to these are referred to as a first lighting unit 601, a second lighting unit 602 and a third lighting unit 603, and it is assumed that the data signals are applied in an order of red, green and blue. However, the order of application may be changed.

First, all of the light sources 6011-6013 of the first light source unit 601 are lighted off, and then, the red data signal begins to scan the red data signal for the first area 3001. The light sources 6011-6013 may be lighted off together with beginning of the scan. After completion of the first area 301, the red light source 601 of the first light source 601 is lighted on.

Similarly, before or together with beginning of operation of data scan for the second area 302, all of the light sources of the second light source unit 602 are lighted off, and after completion of operation of red data scan for the second area 302, the red light source 6012 of the second light source unit 602 is light on.

Similarly, light-off of the third light source unit 603, scan of red data signal for the third area 3003 and light-on of red light source of the third source unit 603 are repeated, and thereby data scan of one frame is completed.

In next frame, before or together with beginning of scan of green data signal for the first area 3001, the red light source 6011 of the first light source 601 lighted on is lighted off. The red light sources in the other areas 3002 and 3003 maintains to be lighted on while the green data signals are applied to the first area 3001.

By repeating the above operation, all of the red, green and blue data signals are applied, and, light-on/off of the light source 6011-6013 are performed.

The interval referred to as "light-off" in FIG. 4 is an interval of lighting off all of the light sources, and the intervals referred to as "R", "G" and "B" are intervals "capable of light-on" that it is possible to light on the each of light sources of red, green and blue. In all of intervals capable of light-on, light may be on, but light is on during some of the intervals. The light-on time can be adjusted as required.

Figure 5:
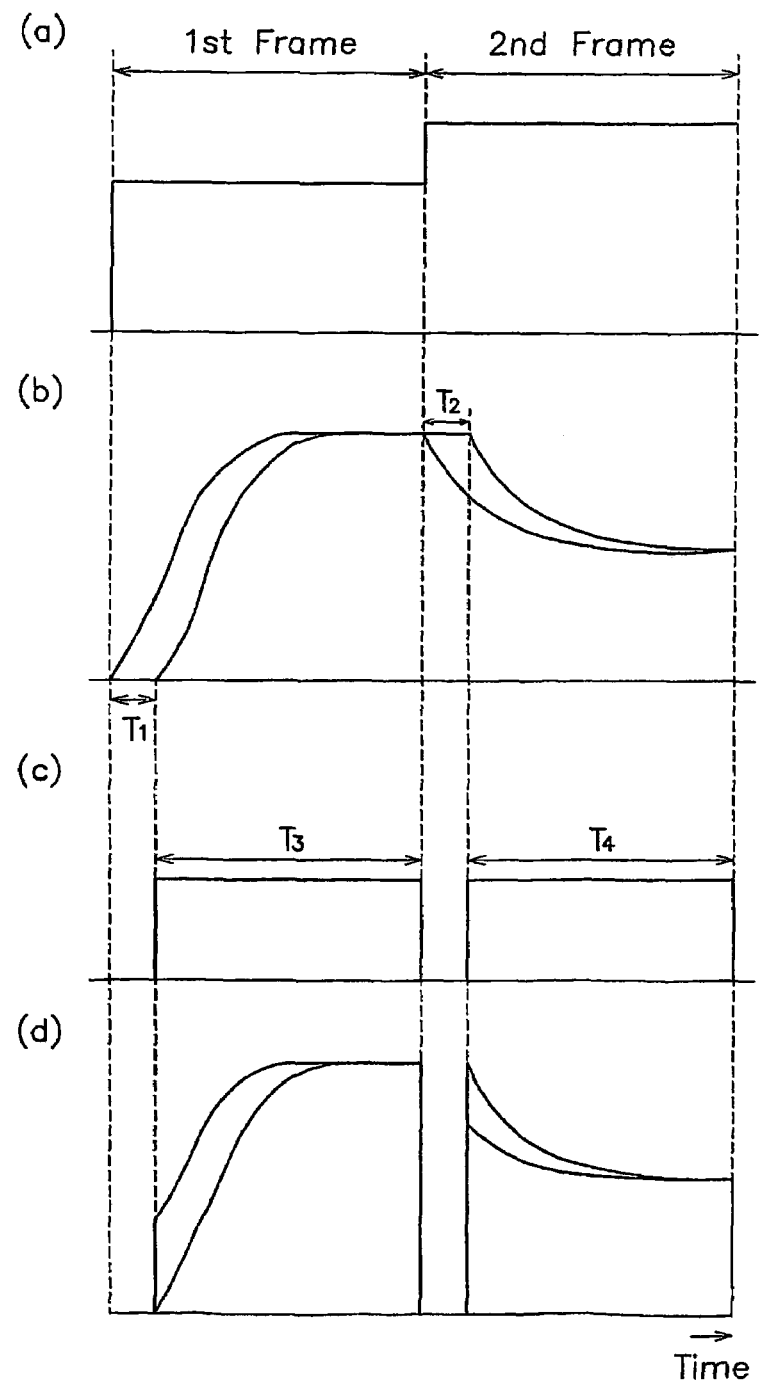
FIGS. 5 to 7 are views to illustrate light-on times of light sources according to embodiments of the present invention.
Figure 6:
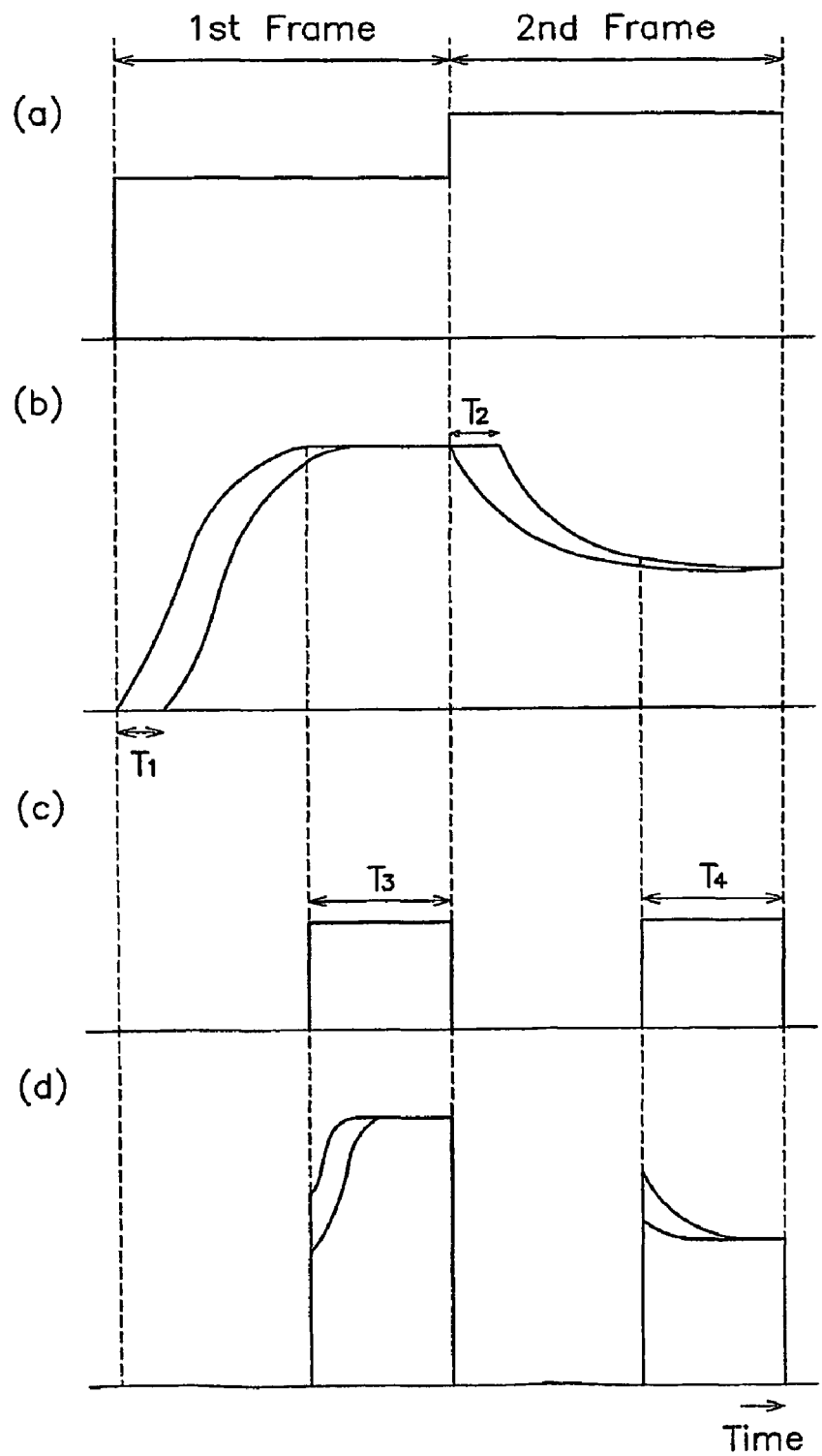
Figure 7:
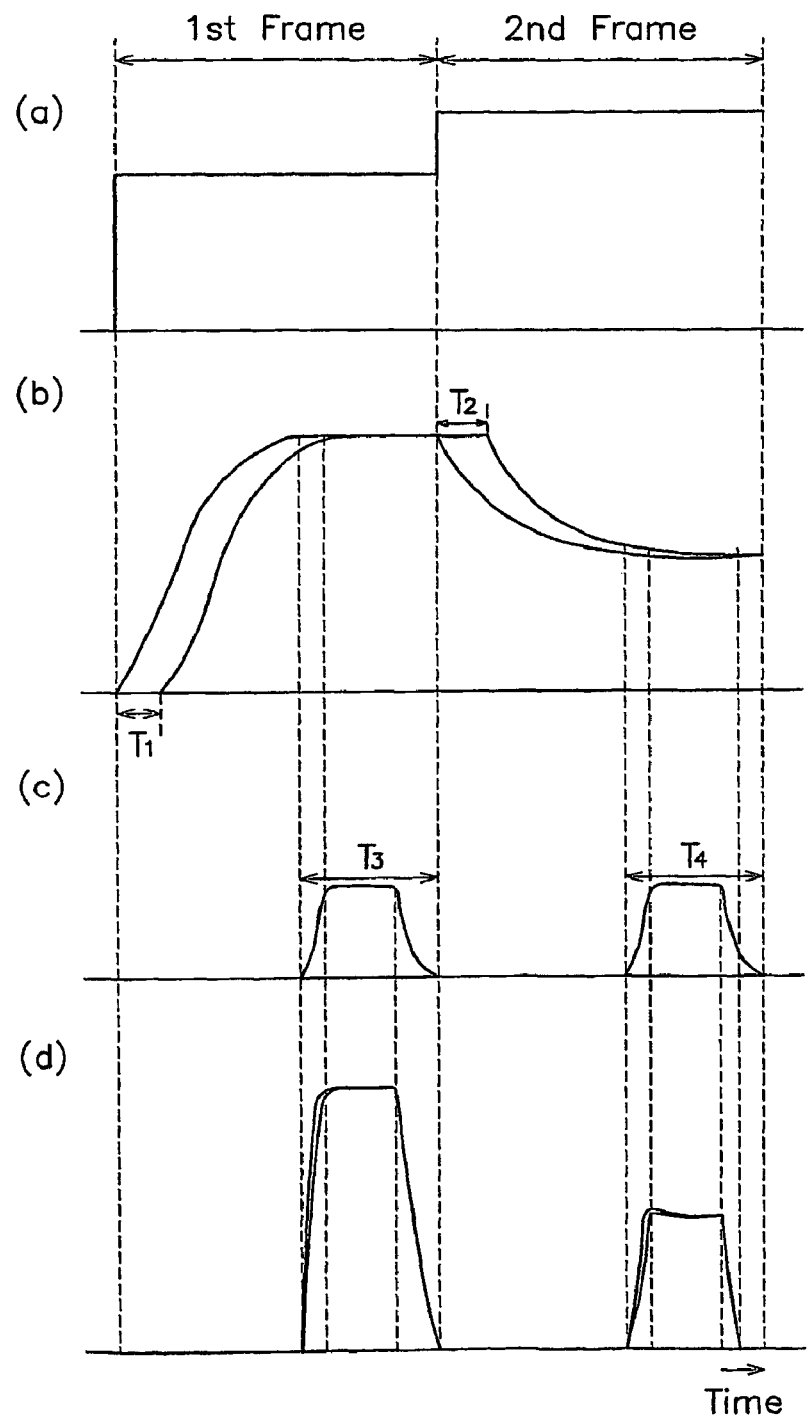

FIG. 5 to FIG. 7 are graphics to illustrate data signals, transmittances, brightness of light sources and brightness of the liquid crystal panel 300 of a liquid crystal display according to time.

In FIG. 5 to FIG. 7, (a) shows a data signal supplied to the liquid crystal panel assembly 300 and (b), (c) and (d) show a transmittance, brightness of light source and brightness of one area of liquid crystal panel assembly 300, for example, the first area 3001, respectively. FIGS. 5 and 6 are examples using a light emitting diode as a light source, and FIG. 7 is an example using a CCEL as a light source.

In FIGS. 5 to 7, a time to apply the data signals to the corresponding areas 3001-3003, as shown in (b), is T1 in case of the first frame, and is T2 in case of the second frame, and T1=T2 in practice. In this case, the transmittance of the liquid crystal layer is slowly changed due to low response speed of the liquid crystal molecules. Since the time to start of scan to the last pixel row is later than that of scan to the first pixel row by T1 or T2, the transmittance thereof begins to be changed with a difference of T1 or T2.

The light source is lighted on right after completion of scan of the data signals, as shown in (c) of FIG. 5, and is lighted off right before scan of data signals of next frame. Therefore, light-on time of the light sources is considerably long since it is T3 and T4 of the rest of time excepting the data scan time.

The liquid crystal panel assembly 300, as shown in (d), represents brightness proportional to the transmittance of the liquid crystal molecules light after light-on the light source. As the transmittance of the liquid crystal molecules increases or decreases, the brightness of the liquid crystal panel assembly 300 also increases or increases, and thereby, when the transmittance thereof is no more changed, the brightness thereof maintains stable.

As shown in (c) of FIG. 6, in an another embodiment of the present invention, after completion of operation of data scan, variation of the transmittance of the liquid crystal molecules arrives at some degree of stable state, and thereafter, the light source is on. It is preferable to control the light-on time so that the duty ratio of the light-on signal the light source is maintained more than 50%, that is, the light-on time T3 and T4 of the light source is equal to or larger than the light-off time. For example, when the liquid crystal panel assembly 300 is divided into eight scan areas to be scanned with data and the scan period of one frame is 5.5 ms, the scan operation of one area is completed and the light source is lighted on after about 0.7 ms. In this way, the entire time of light-on of the light sources is slightly decreased relative to FIG. 5, however, black intervals become longer to generate an impulsive effect, and thus, the color mixture is prevented, and range of variation of brightness is small to improve the image quality.

FIG. 7 is an example using a luminescent lamp such as a CCFL, as a light source, as described above. In this case, since the response speed to signal of the light source itself is low and the brightness is slowly changed at light-on or light-off, the light-on/off time is controlled in consideration of this. In particular, as shown in (c), at light-off, start time of light-off is advanced so that the brightness of the light source is perfectly 0 before start of scan of corresponding area.

In this case, the brightness of the liquid crystal panel assembly 300 forms similar waveform to that of the light source like (d).

As described above, in the embodiment of the present invention, the scan area is divided into three, however, may be into two or more than four, and start time of light-on may be varied depending on the size of the liquid crystal panel assembly, a type of the liquid crystal molecules and the number of dividing the liquid crystal panel assembly.

As described above, in the liquid crystal display of a time divided color display, after the liquid crystal panel assembly is divided into several areas and the light sources of three colors are provided in the divided areas, the light sources of areas in the process of scan are lighted off, and, after completion of scan of the areas, the light sources of the areas are lighted on, and thus, operation of data scan and light-on of the light sources are performed simultaneously. Accordingly, it is possible to secure enough data scan time as well as increase light-on time of the light sources.

With this, since time of charging of electric charges is increased, the image quality is improved and the clearness is increased according to the light-on time of the light sources.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A liquid crystal display of a time divisional color display comprising:
    a liquid crystal panel assembly including a plurality of scan areas, each of which has a plurality of pixels, each having a liquid crystal capacitor filled with a liquid crystal material; and
    a plurality of light source units supplying light to corresponding scan areas of the plurality of scan areas, provided in correspondence with the scan areas,
    wherein the scan areas are sequentially scanned to be provided with data voltages, and each of the light source units comprise a plurality of light sources of single colors, and the data voltages comprise a plurality of color data voltages corresponding to each color of the light sources,
    wherein the color data voltages are alternately supplied to the corresponding scan areas, and the light sources of the light source units are lighted off during scan of the scan areas, and, after each of the light sources of the light source units are lighted off, it is lighted on at least one time during scan of scan areas other than the corresponding scan area.

2. The liquid crystal display of claim 1, wherein the light sources of the single colors comprise red, green and blue light sources.

3. The liquid crystal display of claim 1, wherein each of the pixels further comprises a switching element for switching the data voltage supplied to the liquid crystal capacitor.

4. The liquid crystal display of claim 3, wherein the switching element comprises a control terminal, an input terminal and an output terminal, and the output terminal is connected to the liquid crystal capacitor,
    wherein the liquid crystal display farther comprises a plurality of first signal lines connected to the control terminals to supply control voltages for turning on the switching elements and a plurality of second signal lines connected to input terminals to supply the data voltages.

5. The liquid crystal display of claim 4, wherein the pixels are arranged in a matrix form, and the first signal lines are extended in a row direction and the second signal lines are extended in a column direction.

6. The liquid crystal display of claim 5, wherein the control voltages 5 are supplied in a column direction sequentially, and the data voltages are simultaneously supplied through second signal lines connected to pixels supplied with the conhol voltages.

7. The liquid crystal display of claim 6, wherein the scan lines are arranged in a column direction.

8. The liquid crystal display of claim 7, wherein the light source units are disposed in side of the liquid crystal panel assembly.

9. The liquid crystal display of claim 8, farther comprising a blocking member disposed among the scan areas to block leakage of light.

10. The liquid crystal display of claim 1, farther comprising:
    a data driver selecting gray voltages corresponding to gray signals supply them to the pixels as data voltages;
    a signal controller supplying the gray signals and an input control signal for controlling the gray signals to the data driver; and
    a light controller controlling operation of light-on/off of the light sources according to a control signal from the signal controller.

11. The liquid crystal display of claim 10, wherein the signal controller controls the light source units in order to supply light to corresponding scan areas right after completion of scan.

12. The liquid crystal display of claim 10, wherein the signal controller controls the light source unit in order to supply Piglet to corresponding scan areas after a lapse of a specific period after completion of scan.

13. The liquid crystal display of claim 10, wherein the light sources are luminescent lamps.

14. The liquid crystal display of claim 13, wherein the signal controller controls the light sources in order to be lighted off before a specific period of start of scan.

15. A method of driving a liquid crystal display of a time divisional color display comprising a plurality of first pixels and a plurality of second pixels, each of which has a liquid crystal capacitor filled with liquid crystal material, the method comprising:
    a first light blocking step of blocking light supplied to the first pixels;
    a first data voltages applying step of applying first data voltages to the first light-blocked pixels;

a first light supplying step of supplying light of a first color out of red, green and blue to the first pixels during a first period where applying of the first data voltages are completed;

a second light blocking step of blocking light supplied to the second pixels during a second period;

a second data voltages supplying step of applying second data voltages to the second light-blocked pixels; and a second light supplying step of supplying light of the first color to the pixels where applying of the second data voltages is completed, wherein the second period overlaps the first period at least in part, and the first pixels are light-blocked while being supplied with the first data voltages.

16. The method of claim 15, further comprising:

a third light blocking step of blocking light supplied to the pixels;

a third data voltage applying step of applying third data voltages to the third light-blocked pixels;

a fourth light supplying step of supplying a second color different from a first color out of red, green and blue to the pixels where applying of the third data voltages is completed;

a fourth light blocking step of blocking light supplied to the second pixels; a fourth data voltages applying step of applying fourth data voltages to second the light-blocked pixels; and a fourth light supplying step of supplying light of the second color to the pixels where applying of the fourth data voltages is completed.

17. The method of claim 15, wherein the first or the second light supplying step supplies light after a lapse of a specific time after applying of the data voltages is completed.

18. The method of claim 15, wherein the first or the second light blocking step starts faster than the first or the second data voltages applying step.

19. The method of claim 15, wherein the first data voltages applying step and the second data voltages applying step are performed in succession, the first light supplying step staffs later than the second light blocking step.

20. The liquid crystal display of claim 1, further comprising:

a light-guide plate located at lower side of a liquid crystal panel assembly and divided into several parts;

blocking members provided at borders of several parts of the light-guide plate and preventing light, which is supplied from the light sources to the respective parts of the light-guide plate, from passing over the other parts.

21. The liquid crystal display of claim 20, wherein the blocking member is coated with aluminum.

* * * * *